United States Patent [19]

Matsunaga et al.

[11] 4,189,549
[45] Feb. 19, 1980

[54] POLYESTER RESIN COMPOSITION

[75] Inventors: Hiroomi Matsunaga, Kobe; Yukikazu Uemura, Amagasaki; Teruo Saito; Hiroshi Ishida, both of Takatsuki, all of Japan

[73] Assignee: Sumitomo Chemical Company, Limited, Osaka, Japan

[21] Appl. No.: 811,327

[22] Filed: Jun. 29, 1977

[30] Foreign Application Priority Data

Jun. 30, 1976 [JP] Japan .................................. 51-78092
Jun. 30, 1976 [JP] Japan .................................. 51-78093

[51] Int. Cl.² ....................... C08L 67/02; C08L 69/00
[52] U.S. Cl. ..................................... 525/439; 525/444; 528/193
[58] Field of Search .............. 260/860, 47 C; 528/196

[56] References Cited

U.S. PATENT DOCUMENTS

| | | | |
|---|---|---|---|
| 3,720,732 | 3/1973 | Sevenich | 260/860 |
| 3,884,990 | 5/1975 | Sakata et al. | 260/47 C |
| 3,953,539 | 4/1976 | Kawase et al. | 260/860 |
| 3,972,852 | 8/1976 | Inata et al. | 260/860 |

FOREIGN PATENT DOCUMENTS

| | | | |
|---|---|---|---|
| 951818 | 3/1964 | United Kingdom | 260/860 |
| 1002545 | 8/1965 | United Kingdom | 260/860 |

*Primary Examiner*—Allan Lieberman
*Attorney, Agent, or Firm*—Birch, Stewart, Kolasch and Birch

[57] ABSTRACT

A polyester resin composition having excellent mechanical properties, processability, transparency and surface glossiness of the formed product thereof, which comprises 1 to 99% by weight of an aromatic polyester produced by polycondensing para-hydroxybenzoic acid or a functional derivative thereof (I), 2,2-bis(4'-hydroxyphenyl)propane or a functional derivative thereof (II), and terephthalic acid or a functional derivative thereof (III) and/or isophthalic acid or a functional derivative thereof (IV) in a molar ratio of (I):(II)=1:100 to 100:1 and (II):(III) and/or (IV)=1:10 to 10:1 and 99 to 1% by weight of a polycarbonate or an aliphatic polyester.

2 Claims, No Drawings

POLYESTER RESIN COMPOSITION

The present invention relates to a polyester resin composition, more particularly, a resin composition comprising an aromatic polyester and a polycarbonate or a specific aliphatic polyester.

Aromatic polyesters are usually produced by polycondensation of para-hydroxybenzoic acid or a functional derivative thereof, 2,2-bis(4'-hydroxyphenyl)propane (hereinafter, referred to as "bisphenol A") or a functional derivative thereof and terephthalic acid or a functional derivative thereof and/or isophthalic acid or a functional derivative thereof (hereinafter, the aromatic polyester is referred to as "APE"), and it is known that APE is a transparent resin having a high heat distortion temperature and excellent mechanical and electrical properties, but it is hard to process by a conventional processing machine because of the high flow-starting temperature thereof.

Moreover, polycarbonates (hearinafter, referred to as "PC") have been widely used as a transparent engineering plastic having excellent impact strength and transparency, but it is required to develop an improved PC having improved heat distortion properties with increase of the demand for plastics having better properties in parallel with the advancement of society.

The aliphatic polyesters selected from polyalkylene phenylene esters and polyalkylene phenylene ester ethers have defects such as a low heat distortion temperature and a low tensile strength.

In order to cover a defect of one resin with another resin, it is usually the practice to blend two or more resins having opposite properties from each other, for instance, to blend a resin having an inferior processability with a resin having a superior processability, or to blend a resin having a low heat distortion temperature with a resin having a high heat distortion temperature. However, this method is usually accompanied by unfavorable sacrifices in other properties, such as a deterioration in mechanical properties or an inferior surface glossiness of the formed product thereof.

According to the present inventors' intensive study, it has now been found that the blending of APE and PC or an aliphatic polyester can give a transparent, thermoplastic resin composition having unexpectedly excellent mechanical properties and further an excellent surface glossiness, wherein the processability of APE is improved and further the heat distortion temperature of PC or the aliphatic polyester is enhanced.

An object of the present invention is to provide a polyester resin composition having excellent mechanical properties, processability, transparency and surface glossiness of the formed product thereof.

Another object of the invention is to provide a method for eliminating the defects of APE and PC or the aliphatic polyester without losing the excellent properties which they possess, by blending APE with PC or the aliphatic polyester.

These and other objects of the invention will be apparent from the following description.

APE used in the present invention can be produced by polycondensing para-hydroxybenzoic acid or the functional derivative thereof (e.g. phenyl p-hydroxybenzoate, p-acetoxybenzoic acid) (I), bisphenol A or the functional derivative thereof (e.g. bishphenol A diacetate) (II), and terephthalic acid or the functional derivative thereof (e.g. diphenyl terephthalate, terephthaloyl chloride) (III) and/or isphthalic acid or the functional derivative thereof (e.g. diphenyl isophthalate, isophthaloyl chloride) (IV) in the molar ratio of (I):(II)=1:100 to 100:1 and (II):(III) and/or (IV)=1:10 to 10:1. The polycondensation can be carried out by the conventional polymerization methods, such as bulk polymerization, slurry polymerization, solution polymerization, interfacial polymerization, or the like.

PC used in the present invention has an average molecular weight of 5,000 to 100,000 and includes 4,4-dihydroxydiarylalkane polycarbonates, for instance, polycarbonates produced from a 4,4-dihydroxydiphenylalkane [e.g. bis(4-hydroxyphenyl)methane, bis(4-hydroxyphenyl)ethane, 2,2-bis(4-hydroxyphenyl)propane, bis(4-hydroxy-3,5-dichlorophenyl)methane, 2,2-bis(4-hydroxy-3,5-dimethylphenyl)propane, bis(4-hydroxyphenyl)phenylmethane, etc.] and phosgene or diphenyl carbonate.

The aliphatic polyesters include the polyalkylene phenylene esters and polyalkylene phenylene ester ethers of the following formula:

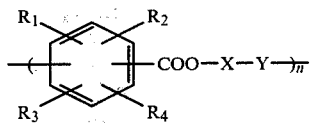

wherein $R_1$, $R_2$, $R_3$ and $R_4$ are the same or different and are each hydrogen, an alkyl having 1 to 6 carbon atoms (e.g. methyl, ethyl, n-propyl, isopropyl), a halogen (e.g. fluorine, bromine, chlorine), an alkoxy having 1 to 6 carbon atoms (e.g. methoxy, ethoxy), an alkoxycarbonyl having 2 to 6 carbon atoms (e.g. methoxycarbonyl, ethoxycarbonyl), cyano, amino, sulfonyl, nitro or phenoxy; X is a divalent aliphatic hydrocarbon group having 1 to 10 carbon atoms (e.g. methylene, dimethylene, trimethylene, tetramethylene, pentamethylene, hexamethylene, heptamethylene, octamethylene, nonamethylene, decamethylene, propylene, methyltrimethylene); Y is —COO— or —O—; and n is 30 to 500.

Suitable examples of the aliphatic polyesters are polyalkylene phenylene esters, such as polyethylene terephthalate, polyethylene isophthalate, polypropylene terephthalate, polypropylene isophthalate, polytrimethylene terephthalate, polytrimethylene isophthalate, polytrimethylene phthalate, polytetramethylene terephthalate, polytetramethylene isophthalate, polytetramethylene phthalate, polypentamethylene terephthalate, polypentamethylene isophthalate, polyhexamethylene terephthalate, polyhexamethylene isophthalate, polyheptamethylene terephthalate, polyoctamethylene terephthalate, polynonamethylene terephthalate, and polydecamethylene terephthalate, and polyalkylene phenylene ester ethers, such as polyethylene-p-phenylene ester ether, polyethylene-m-phenylene ester ether, polyethylene-o-phenylene ester ether, polypropylene-p-phenylene ester ether, polypropylene-m-phenylene ester ether, polypropylene-o-phenylene ester ether, polytrimethylene-p-phenylene ester ether, polytrimethylene-m-phenylene ester ether, polytrimethylene-o-phenylene ester ether, polytetramethylene-p-phenylene ester ether, polytetramethylene-m-phenylene ester ether, polytetramethylene-o-phenylene ester ether, polypentamethylene-p-phenylene ester ether, polypentamethylene-m-phenylene ester ether, polypentamethylene-o-phenylene ester ether, polyhexamethylene-p-phenylene ester ether, polyhexamethylene-m-phenylene ester ether, polyheptamethylene-p-phenylene ester ether, polyheptamethylene-m-phenylene ester ether, polyoctamethylene-p-phenylene ester ether, polyoctamethylene-m-phenylene ester ether, or the like.

The polyester composition of the present invention contains 1 to 99% by weight of APE and 99 to 1% by weight of PC or the aliphatic polyester based on the total weight of the composition.

When the composition contains more than 99% by weight of APE, the processability of APE is not sufficiently improved, and on the other hand, when the content of APE is less than 1% by weight, the heat distortion temperature thereof is not enhanced, and the mechanical properties thereof are not improved, either. A suitable range of the APE content in the polyester resin composition is 10 to 95% by weight.

The polyester resin composition of the present invention can be produced by mixing uniformly the components by the conventional mixing methods, for instance, by blending the solutions of each component, or mixing them in a mixing machine, such as a twin roll mill, a Banbury mixer, an extruder or other known mixing machines.

The polyester resin composition of the present invention has various utilities, for instance, as electric or electronic parts (e.g. connector, parts of hair dryer, flexible printed circuit, parts of color television, etc.), mechanical parts (e.g. cover of motor, housing for electric tool, impeller for pump, parts for motorcar), as helmets, baths, containers for drugs and foodstuffs, parts of cigarette lighters, or the like.

The present invention is illustrated by the following Examples, but is not limited thereto.

In Examples, various properties are measured as follows:

Heat distortion temperature: by the method as defined in ASTM D 569-59, at a load of 18.6 kg/cm$^2$.

Mechanical properties: it is known by Izod impact strength (with notch) as defined in ASTM D 256.

Processability: it is shown by the injection molding temperature at which the spiral flow length (width: 8 mm, thickness: 3 mm) is 30 cm, when it is injection-molded at an injection pressure: 800 kg/cm$^2$ and a temperature of mold: 100° C. using injection molding machine SAV-30A (made by Sanjo Seiki K.K.).

EXAMPLE 1

Into a four-necked flask provided with a reflux condenser and an agitating blade are charged para-hydroxybenzoic acid (124.2 g, 0.9 mol), bisphenol A (68.4 g, 0.3 mol), terephthalic acid (49.8 g, 0.3 mol) and acetic anhydride (168.3 g, 1.65 mol). The mixture is reacted with agitation under nitrogen gas at a reflux temperature (about 140° C.) for 4 hours. Thereafter, the evaporation of acetic acid and unreacted acetic anhydride is initiated while passing nitrogen gas thereto. While gradually raising the temperature, the reaction mixture is continuously agitated. When the inner temperature reaches 300° C., the agitation is stopped, and then the content of the flask is rapidly poured onto an aluminum-made dish. The prepolymer thus prepared is pulverized with a pulverizer, and the resulting powder is placed on an evaporating dish. This dish is put in a hot air dryer, into which nitrogen gas is passed, and then, the powder of the prepolymer is pre-heated at 180° C. for 10 hours. Immediately, the temperature is raised to 210° C. and the powder is heated at this temperature for 5 hours, and thereafter, the temperature is immediately raised to 240° C. and then it is heated at this temperature for 5 hours to proceed with the solid phase polymerization reaction. The polymer thus prepared is slighly fused, but it is easily ground by pressing it with a finger, which means that the polymer is not substantially fused.

The polymer (APE) is mixed well with polyethylene terephthalate (RT-560, made by Toyo Boseki K.K., hereinafter referred to merely as "PET") in the ratio as shown in the following Table 1 with a mixer. The mixture is supplied into a screw extruder (screw diameter: 30 mm$\phi$, L/D (Length/diameter)=20) provided with a die (diameter: 4 mm$\phi$) at the tip and is extruded at a temperature as shown in Table 1 and a screw revolution number of 30 r.p.m. The resulting strand is cut in a length of 3 mm to give granular test samples. The test samples are injection-molded and further are press-molded at a temperature as shown in Table 1 to give a sheet (160 mm×160 mm×3 mm). Various properties of the product are tested. The results are shown in Table 1. As a reference, the properties of APE and PET alone are also shown in Table 1.

Table 1

| APE/PET (ratio by weight) | Extrusion temperature (°C.) | Temperature for press-molding (°C.) | Izod impact strength (kg . cm/cm) | Heat distortion temperature (°C.) | Temperature for injection molding (°C.) | Remarks |
|---|---|---|---|---|---|---|
| 100/0 | 330 | 320 | 23 | 200 | 360 | Reference |
| 70/30 | 310 | 300 | 18 | 170 | 320 | The present invention |
| 50/50 | 290 | 280 | 12 | 140 | 275 | " |
| 30/70 | 270 | 260 | 8 | 110 | 260 | " |
| 0/100 | 250 | 240 | 5 | 70 | 240 | Reference |

As is clear from the above results, in the composition of the present invention, the processability of APE is improved and the heat resistance of PET is also improved, and further all compositions provide molded products having a beautiful surface.

EXAMPLE 2

The same APE as used in Example 1 is mixed well with PC (IUPILON S 2000 comprising a polycarbonate having a repeating unit:

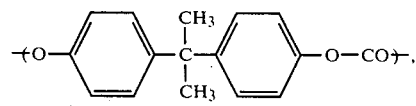

made by Mitsubishi Gas Chemical Co.) in the ratio as shown in the following Table 2 with a mixer. The mixture is supplied into a screw extruder (screw diameter: 30 mm$\phi$, L/D=20) provided with a die (diameter: 4 mm$\phi$) at the tip and is extruded at a temperature as shown in Table 2 and at a screw revolution number of 30 r.p.m. The resulting strand is cut in a length of 3 mm to give granular samples. The samples are injection-molded and further are press-molded at a temperature as shown in Table 2 to give a sheet (160 mm × 160 mm × 3 mm). Various properties of the product are tested. The results are shown in Table 2. As a reference, the properties of APE and PC alone are also shown in Table 2.

Table 2

| APE/PC (ratio by weight) | Extrusion temperature (°C.) | Temperature for press-molding (°C.) | Izod impact strength (kg . cm/cm) | Heat distortion temperature (°C.) | Temperature for injection molding (°C.) | Remarks |
| --- | --- | --- | --- | --- | --- | --- |
| 100/0 | 330 | 320 | 23 | 200 | 360 | Reference |
| 70/30 | 310 | 300 | 38 | 182 | 340 | The present invention |
| 50/50 | 290 | 280 | 48 | 164 | 320 | " |
| 30/70 | 270 | 260 | 62 | 148 | 300 | " |
| 0/100 | 240 | 230 | 70 | 130 | 280 | Reference |

EXAMPLE 3

In the same manner as described in Example 1, a prepolymer is prepared from terephthalic acid (0.5 mol), isophthalic acid (0.5 mol), bisphenol A diacetate (1 mol) and para-acetoxybenzoic acid (3 mol). The prepolymer is pre-heated at 180° C. for 10 hours, and further is heated at 210° C. for 5 hours and at 240° C. for 5 hours to proceed with the solid phase polymerization reaction to give a polymer.

The polymer (APE) thus prepared is mixed well with polytetramethylene terephthalate (TAFPET N-1000, made by Toyo Boseki K.K., hereinafter referred to merely as "PTMT") in the ratio as shown in the following Table 3. The mixture is treated in the same manner as described in Example 1 to give test samples. Various properties of the samples are tested. The results are shown in Table 3. As a reference, the properties of APE and PTMT alone are also shown in Table 3.

Table 3

| APE/PTMT (ratio by weight) | Extrusion temperature (°C.) | Temperature for press-molding (°C.) | Izod impact strength (kg . cm/cm) | Heat distortion temperature (°C.) | Temperature for injection molding (°C.) | Remarks |
| --- | --- | --- | --- | --- | --- | --- |
| 100/0 | 350 | 340 | 30 | 205 | 370 | Reference |
| 70/30 | 320 | 310 | 25 | 170 | 330 | The present invention |
| 50/50 | 300 | 290 | 20 | 140 | 330 | " |
| 30/70 | 270 | 260 | 13 | 105 | 270 | " |
| 0/100 | 250 | 240 | 4 | 65 | 240 | Reference |

As is clear from the above results, in the compositions of the present invention, the processability of APE is improved and further the heat resistance of PTMT is also improved.

EXAMPLE 4

The same APE as used in Example 3 is mixed well with PC (IUPILON S 3000 comprising a polycarbonate having a repeating unit:

$$-\!\!\left(\!\!O\!-\!\!\!\bigcirc\!\!\!-\!\!\underset{\underset{CH_3}{|}}{\overset{\overset{CH_3}{|}}{C}}\!\!-\!\!\bigcirc\!\!\!-\!O\!-\!CO\!\right)\!\!-,$$

made by Mitsubishi Gas Chemical Co.) in the ratio as shown in the following Table 4. The mixture is treated in the same manner as described in Example 1 to give test samples. Various properties of the samples are tested. The results are shown in Table 4. As a reference, the properties of APE and PC alone are also shown in Table 4.

Table 4

| APE/PC (ratio by weight) | Extrusion temperature (°C.) | Temperature for press-molding (°C.) | Izod impact strength (kg . cm/cm) | Heat distortion temperature (°C.) | Temperature for injection molding (°C.) | Remarks |
| --- | --- | --- | --- | --- | --- | --- |
| 100/0 | 350 | 340 | 30 | 205 | 370 | Reference |
| 70/30 | 320 | 310 | 43 | 185 | 345 | The present invention |
| 50/50 | 300 | 290 | 58 | 165 | 320 | " |
| 30/70 | 270 | 260 | 72 | 148 | 295 | " |
| 0/100 | 240 | 240 | 80 | 130 | 270 | Reference |

As is clear from the above results, the compositions of the present invention show a high impact strength, and the processability of the APE is improved and the heat resistance of the PC is also improved.

What is claimed is:

1. A polyester resin composition comprising 1 to 99% by weight of an aromatic polyesyter produced by polycondensing para-hydroxybenzoic acid or a functional derivative thereof (I), 2,2-bis(4'-hydroxyphenyl)propane or a functional derivative thereof (II), a terephthalic acid or a functional derivative thereof (III) and/or isophthalic acid or a functional derivative thereof (IV) in a molar ratio of (I):(II)=1:100 to 100:1 and (II):(III) and/or (IV)=1:10 to 10:1, and 99 to 1% by weight of a 4,4-dihydroxydiarylalkane polycarbonate having an average molecular weight of 5,000 to 100,000 or a polyalkylene phenylene ester and/or a polyalkylene phenylene ester ether, said polyalkylene phenylene ester and polyalkylene phenylene ester ether having the following formula:

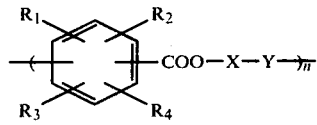

wherein $R_1$, $R_2$, $R_3$ and $R_4$ are the same or different and are each hydrogen, an alkyl having 1 to 6 carbon atoms, a halogen, an alkoxy having 1 to 6 carbon atoms, an alkoxycarbonyl having 2 to 6 carbon atoms, cyano, amino, sulfonyl, nitro or phenoxy; X is a divalent aliphatic hydrocarbon group having 1 to 10 carbon atoms; Y is —COO— or —O—; and n is 30 to 500.

2. The polyester resin composition according to claim 1, wherein the aromatic polyester is contained therein in the amount of 10 to 95% by weight on the basis of the total weight of the composition.

* * * * *